United States Patent
Staehli et al.

(10) Patent No.: US 9,671,792 B2
(45) Date of Patent: Jun. 6, 2017

(54) METHOD FOR AUTOMATIC POSITIONING OF A GAS TURBINE ROTOR

(71) Applicant: ALSTOM Technology Ltd, Baden (CH)

(72) Inventors: Felix Staehli, Baden (CH); Axel Haerms, Nussbaumen (CH); Dirk Matthes, Mellingen (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 427 days.

(21) Appl. No.: 14/250,706

(22) Filed: Apr. 11, 2014

(65) Prior Publication Data

US 2014/0309786 A1 Oct. 16, 2014

(30) Foreign Application Priority Data

Apr. 12, 2013 (EP) .................................... 13163455

(51) Int. Cl.
*G05D 3/00* (2006.01)
*F01D 25/36* (2006.01)

(52) U.S. Cl.
CPC .............. *G05D 3/00* (2013.01); *F01D 25/36* (2013.01)

(58) Field of Classification Search
None
See application file for complete search history.

(56) References Cited

U.S. PATENT DOCUMENTS

| | | | |
|---|---|---|---|
| 4,193,739 A | 3/1980 | Lucey | |
| 4,643,637 A | 2/1987 | Strickler | |
| 7,140,240 B2 * | 11/2006 | Gustafson | F01D 25/285 73/112.01 |
| 7,204,090 B2 * | 4/2007 | O'Connor | F02C 7/275 60/39.08 |
| 7,750,593 B2 * | 7/2010 | Tillotson | B64C 13/12 318/568.11 |
| 7,866,234 B2 * | 1/2011 | Smart | F01D 25/36 73/112.01 |
| 7,926,287 B2 * | 4/2011 | Ullyott | F01D 21/06 60/773 |
| 7,941,281 B2 * | 5/2011 | Rai | F01D 21/003 702/34 |
| 8,308,435 B2 * | 11/2012 | Storace | G01M 1/22 416/145 |
| 2008/0100252 A1 * | 5/2008 | Tillotson | B64C 13/12 318/628 |

(Continued)

FOREIGN PATENT DOCUMENTS

CN 101586503 A 11/2009
CN 102661203 A 9/2012

(Continued)

*Primary Examiner* — Van Nguyen

(74) *Attorney, Agent, or Firm* — Buchanan Ingersoll & Rooney PC

(57) ABSTRACT

A method for positioning a rotor of a gas turbine automatically is provided that includes gathering data with a control unit, and processing this data to bring the rotor to a desired position which is set according a Human Machine Interface (HMI). The indication of the lay of the rotor to the control unit is done by a key phasor, which includes a sensor which gets a digital pulse for each revolution of a phasor cam wheel. This digital pulse is used to give the information of the lay of the rotor to the control unit.

18 Claims, 1 Drawing Sheet

(56) References Cited

U.S. PATENT DOCUMENTS

| | | | |
|---|---|---|---|
| 2009/0304515 A1* | 12/2009 | Hanrieder | B23K 13/01 416/213 R |
| 2010/0161245 A1* | 6/2010 | Rai | F01D 21/003 702/35 |
| 2012/0063884 A1* | 3/2012 | Klingels | F01D 11/22 415/1 |
| 2012/0204395 A1 | 8/2012 | Jones et al. | |
| 2012/0285226 A1 | 11/2012 | Laurer et al. | |

FOREIGN PATENT DOCUMENTS

| | | |
|---|---|---|
| EP | 1 609 957 | 12/2005 |
| EP | 1 749 979 | 2/2007 |
| EP | 2 363 575 | 9/2011 |
| EP | 2 495 553 | 9/2012 |
| GB | 2467202 | 7/2010 |
| JP | H06-108803 | 4/1994 |
| JP | 2007-113412 | 5/2007 |

* cited by examiner

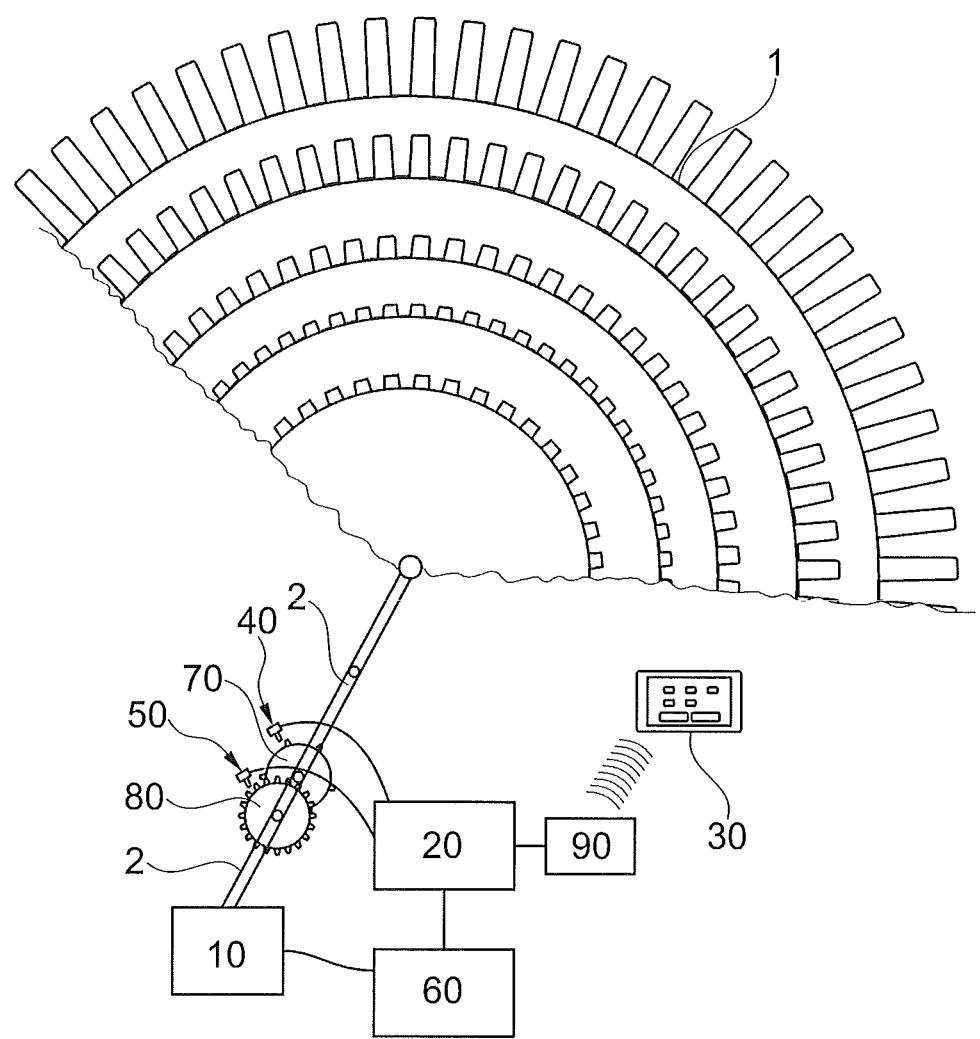

METHOD FOR AUTOMATIC POSITIONING OF A GAS TURBINE ROTOR

CROSS-REFERENCE TO RELATED APPLICATIONS

This application claims priority to European application 13163455.2 filed Apr. 12, 2013, the contents of which are hereby incorporated in its entirety.

TECHNICAL FIELD

The present invention relates to a method for positioning the rotor of a gas turbine in an accurate and automatic way.

BACKGROUND

During the useful life of a gas turbine, maintenance operations are necessary for guaranteeing the correct functioning of the turbine itself. During these periodical operations, controls and inspections are done and damaged or worn parts or components are substituted.

The parts of a turbine which are most subject to wear are the turbine blades as they undergo mechanical stress at a high temperature and are also subject to hot corrosion due to the hot gases with which the turbine operates. Therefore, there exists the necessity of periodical inspections of the turbine blades to control their integrity and functionality. During programmed maintenance operations, in order to be able to inspect the blades of the turbine, it is usually necessary to rotate the blades of the turbine, which is done by rotating the whole turbine rotor. This is applied especially in the case of a boroscopic inspection, where the turbine is opened, decoupled from the compressor, so that the blades can then be inspected by means of a boroscope.

Large turbomachinery rotors, particularly of large gas turbines, need to be rotated at a very low rotational speed and to an exact positioning during boroscopic inspection in order to precisely carry out operations on the rotor, such as mechanical rotor maintenance, rotor balancing or rotor alignment. Typically, boroscopes are used for this kind of inspection work, where the area to be inspected is inaccessible by other means: boroscopes are optical devices comprising illuminating means for the illumination of the remote object to be inspected, such that an internal image of the illuminated object is obtained and is further magnified to be presented to the viewer's eyes.

Boroscopes are commonly used in the visual inspection of industrial gas turbines, as gas turbines require particular attention because of safety and maintenance requirements. Boroscope inspection can be used to prevent unnecessary maintenance, which can become extremely costly for large gas turbines.

Typically, at present, the required rotation of the rotor of a gas turbine for boroscopic inspection is carried out manually, such that a person manually rotates the rotor; however, this task is not accurate when performed.

One disadvantage of this method is that it takes longer for inspecting the blades, representing a considerable cost as it reduces the productivity of the turbine itself. In addition to this cost, there is the cost of labour.

Different boroscope devices used for the inspection of turbomachines are is known in the state of the art. For example, document EP 2495553 A2 discloses a portable boroscope assembly used for the inspection of turbomachine blades. Also known in the art is document US 2012/0204395 A1 (issued as U.S. Pat. No. 8,910,359), disclosing a method for inspecting and/or repairing a component in a gas turbine engine, by using a boroscope. Also, document US 2012/0285226 A1 (issued as U.S. Pat. No. 8,695,445) discloses a system having a wear-indicating mark applied to a portion of surface of an internal component in a turbine, this mark being visually discernible through boroscopic inspection. Also known in the art, as per document EP 1749979 A2, is a movement system comprising a crank rotation mechanism having a reducer group for rotating, in particular manually, the shaft of the turbine to allow the inspection of blades by means of a boroscope, avoiding at the same time the necessity of decoupling said turbine from the compressor. However, all these documents of the prior art that have been cited move the rotor (shaft) of the turbine manually, therefore being not accurate and being costly and time consuming.

Another system for rotating a shaft of a turbine, known in the art, is for example the one shown in document U.S. Pat. No. 4,193,739, where a device for turning a rotor of a gas turbine engine is disclosed for inspection purposes, comprising a nozzle that directs a jet of air onto the blades to turn the rotor. Also, the device comprises a rod that can move axially and that can stop the rotor. However, this system is not accurate and also requires human exertion, which makes it costly and time consuming. Also, this system is not able to provide a variable speed control on the rotor speed, in order to accurately effect boroscopic inspections in the gas turbine.

The present invention is directed towards providing the above-mentioned needs.

SUMMARY

The present invention relates to a method for positioning the rotor of a gas turbine in an accurate and automatic way. The method of the invention actuates the rotor of the gas turbine automatically, so that no human actuation is needed, and remotely, being able to move the rotor at a variable speed, also being able to stop the rotor at a specific and accurate position automatically, and can also memorize past positioning of the rotor.

BRIEF DESCRIPTION OF DRAWINGS

The foregoing objects and many of the attendant advantages of this invention will become more readily appreciated as the same becomes better understood by reference to the following detailed description when taken in conjunction with the accompanying drawing, wherein.

FIG. 1 shows a schematic view of the whole configuration of the rotor positioning method according to the present invention within the gas turbine.

DETAILED DESCRIPTION

The present invention relates to a method for positioning the rotor 2 of a gas turbine 1 in an accurate and automatic way by means of:
- a feedback loop, comprising a key phasor 40 and an incremental counter 50;
- a frequency converter 60;
- a rotor barring actuator 10;
- a HMI (Human Machine Interface) 30, and
- a control unit 20.

The Feedback Loop (Key Phasor 40 and Incremental Counter 50)

The key phasor 40 in combination with the incremental counter 50 is used as the feedback for the control unit 20.

The key phasor 40 typically comprises a sensor which gets a digital pulse for each revolution of the rotor 2 by the cog placed on the cam wheel for the key phasor 70, this digital pulse is used to give the information of the lay of the rotor 2. The incremental counter 50 typically also comprises a sensor that gives a digital pulse for each cog of the incremental cam wheel 80. The information from the key phasor 40 in combination with the information from the incremental counter 50 are processed in the control unit 20 to determine the position of the rotor 2.

The Frequency Converter 60

The frequency converter 60 drives the rotor barring actuator 10 which is moving the rotor 2 of the gas turbine 1. The optimal speed of the rotor 2 to reach the desired position as fast as possible is controlled by the control unit 20.

The Rotor Barring Actuator 10

The rotor barring actuator 10 moves the rotor 2 according the given set point received from the control unit 20 by means of the frequency converter 60.

The HMI (Human Machine Interface) 30

The HMI (Human Machine Interface) is a device where a person can control the automatic rotor positioning in a remote way. The HMI 30 typically comprises an antenna 90 inside which connects to the control unit 20.

The Control Unit 20

The control unit 20 comprises an interface to:
the HMI 10, which would typically be wireless;
the frequency converter 60;
the key phasor 40, and
the incremental counter 50.

The control unit 20 comprises a computer processing unit (cpu) for processing all the information received. This computer processing unit always calculates the optimal speed of the rotor 2 to reach the desired position which is set by the HMI 30, as fast as possible. Additionally, the control unit 20 can comprise a toggle mode as well as a memory function so that the rotor barring actuator 10 can lead the rotor 2 back to a position which was chosen in the past.

As it has been described, the main advantages provided by the method for positioning the rotor 2 of a gas turbine 1 according to the invention are the following:
a more accurate positioning of the rotor 2 is obtained;
only one person is needed;
there is no need to have access to the rotor 2 and to turn it manually, as in the prior art;
the risks are highly minimized as nobody needs to act on the rotor 2 or turn it manually.

Although the present invention has been fully described in connection with preferred embodiments, it is evident that modifications may be introduced within the scope thereof, not considering this as limited by these embodiments, but by the contents of the following claims.

The invention claimed is:

1. A method for positioning a rotor of a pas turbine automatically, comprising:
gathering data with a control unit, wherein the gathering of the data comprises:
a key phasor comprising a sensor getting a digital pulse for each revolution of the rotor via a cog placed on a cam wheel; and
an incremental counter comprising a sensor giving a digital pulse for each cog of the cam wheel;
receiving, by the control unit, input from a Human Machine Interface, that identifies a position to which the rotor is to be moved; and
processing, by the control unit, the gathered data to bring the rotor to the identified position based on the input from the Human Machine Interface, wherein the processing by the control unit of the gathered data to bring the rotor to the identified position based on the input from the Human Machine Interface comprises:
a computer processing unit of the control unit calculating a speed of the rotor to reach the identified position;
the control unit communicating with a frequency converter driving a rotor barring actuator to move the rotor such that the rotor is moved at the calculated speed to the identified position.

2. The method according to claim 1, comprising:
using the key phasor to indicate a lay of the rotor to the control unit.

3. The method according to claim 2, wherein the the digital pulse gotten by the sensor of the key phasor is used to give information of the lay of the rotor to the control unit.

4. The method according to claim 2, comprising:
using information of movement of the rotor via the incremental counter to provide the information of the movement of the rotor to the control unit.

5. The method according to claim 4, the digital pulse given by the sensor of the incremental counter is used to give the information of the movement of the rotor to the control unit.

6. The method according to claim 5, comprising
sending the lay data of the rotor from the key phasor to the control unit to process the lay data; and
sending the information of the movement of the rotor from the incremental counter to the control unit to process the information of the movement of the rotor.

7. The method of claim 6, wherein the Human Machine Interface comprises an antenna and is wirelessly connected to the control unit.

8. The method of claim 7, wherein the Human Machine Interface is comprised of a mobile device.

9. The method of claim 8, comprising:
moving the Human Machine Interface; and
wirelessly sending the input from the Human Machine Interface to the control unit to identify the position of the rotor after the Human Machine Interface is moved.

10. The method of claim 1, comprising:
inspecting the rotor after the rotor is moved via the control unit.

11. The method of claim 1, comprising:
moving the Human Machine Interface; and
wirelessly sending the input from the Human Machine Interface to the control unit to identify the position of the rotor after the Human Machine Interface is moved.

12. The method of claim 11, comprising:
performing an inspection of the rotor after the rotor is moved to the identified position.

13. The method of claim 11, wherein the rotor is moved without manual turning of the rotor.

14. The method of claim 11, wherein the rotor is moved to the desired position with the rotor being isolated from personnel.

15. A method of positioning a rotor of a gas turbine automatically, the method comprising:
sending lay data of the rotor from a key phasor to the control unit to process the lay data, the key phasor comprising a sensor getting a digital pulse for each revolution of the rotor by a cog placed on a cam wheel, the lay data based on the digital pulse;

sending movement information data of the rotor from an incremental counter to the control unit, the incremental counter comprising a sensor giving a digital pulse for each cog of the cam wheel, the movement information data based on the digital pulse for each cog of the cam wheel;

wirelessly sending input from a Human Machine Interface to the control unit to identify a position of the rotor;

a computer processing unit of the control unit calculating a speed of the rotor at which the rotor is to rotate to reach the identified position; and the control unit communicating with a frequency converter driving a rotor barring actuator to move the rotor such that the rotor is moved to the identified position at the calculated speed.

16. The method of claim 15, comprising:
moving the Human Machine Interface prior to sending the input to the control unit.

17. The method of claim 16, comprising:
inspecting the rotor after the rotor is moved to the identified position.

18. The method of claim 17, wherein the rotor is moved to the identified position without manual turning of the rotor.

\* \* \* \* \*